Feb. 17, 1970 C. M. FREY 3,495,408
SELF-ACTUATING NOZZLE PLUG
Filed Nov. 8, 1967

CHRISTIAN M. FREY
INVENTOR.

BY *Steven Fitton*

ATTORNEY

United States Patent Office 3,495,408
Patented Feb. 17, 1970

3,495,408
SELF-ACTUATING NOZZLE PLUG
Christian M. Frey, Los Altos, Calif., assignor to United
Aircraft Corporation, East Hartford, Conn., a corporation of Delaware
Filed Nov. 8, 1967, Ser. No. 681,544
Int. Cl. F02k 9/06, 1/18
U.S. Cl. 60—250          10 Claims

ABSTRACT OF THE DISCLOSURE

A dual thrust reaction motor is provided with self-actuating means for obstructing a portion of the area of the thrust producing nozzle means when the boost phase is terminated and the sustain phase initiated, whereby operation at a substantially constant chamber pressure is obtained for both boost and sustain phases. A piston movable within a cylinder is employed to obstruct a portion of the area of the nozzle means, the cylinder being provided with bleed means for increasing the pressure within the cylinder to the chamber pressure prior to termination of the boost phase and for preventing the rapid reduction of the pressure upon termination of the boost phase. On termination of the boost phase, this pressure drives the piston into the obstructing position.

BACKGROUND OF THE INVENTION

Many missiles require a rocket to deliver high thrust for a short time followed by a low thrust for an extended period. This is needed to accelerate the missile to a high velocity and then to sustain the missile at this high velocity. This is currently accomplished by causing the rocket motor to operate at a high pressure during boost and at a low pressure during sustain while using a nozzle of a single fixed configuration for both phases. It then follows that the nozzle thrust coefficient cannot be made optimum at both pressure levels and therefore is designed to obtain the best compromise.

Another approach has been to vary the area of the nozzle by means of a plug which is itself a secondary nozzle having a smaller throat area than the main nozzle such as is described in U.S. Patents No. 3,011,309 and No. 3,182,447. Such systems inherently have a higher expansion ratio during the sustain phase than during the boost phase thereby making it impossible to operate at optimum conditions in boost and sustain if the chamber pressure is the same in both phases. If it is desired to operate such systems at optimum expansion ratios in both phases, it is necessary to operate the sustain phase at a higher chamber pressure than the boost phase. This mode of operation, however, is partially self-defeating since thrust is proportional to chamber pressure. In addition to these problems, no system for varying the nozzle area heretofore developed is simple, practical, reliable, completely self actuating and self-contained.

It is accordingly an object of this invention to provide a self-actuating nozzle plug means.

It is another object of this invention to provide a rocket motor capable of operating at substantially optimum conditions at both high and low thrust levels.

DESCRIPTION OF THE INVENTION

Figure 1:
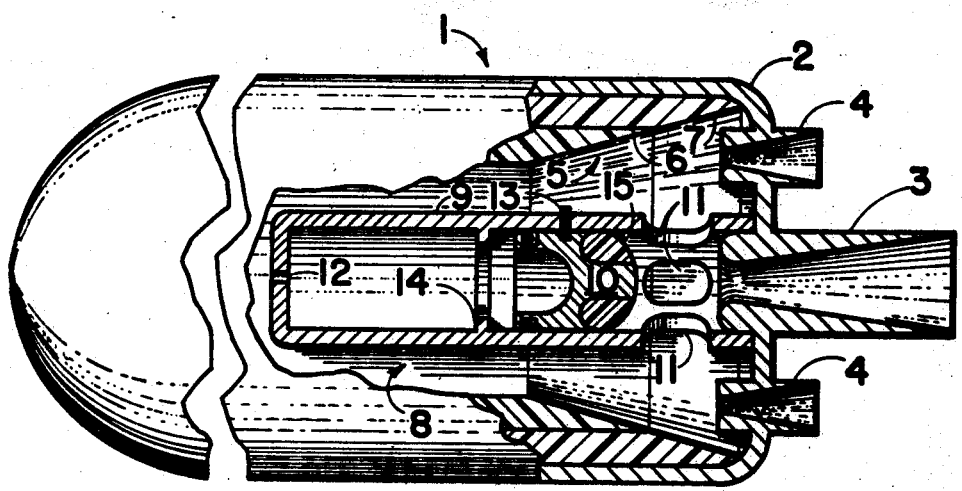
Figure 2:
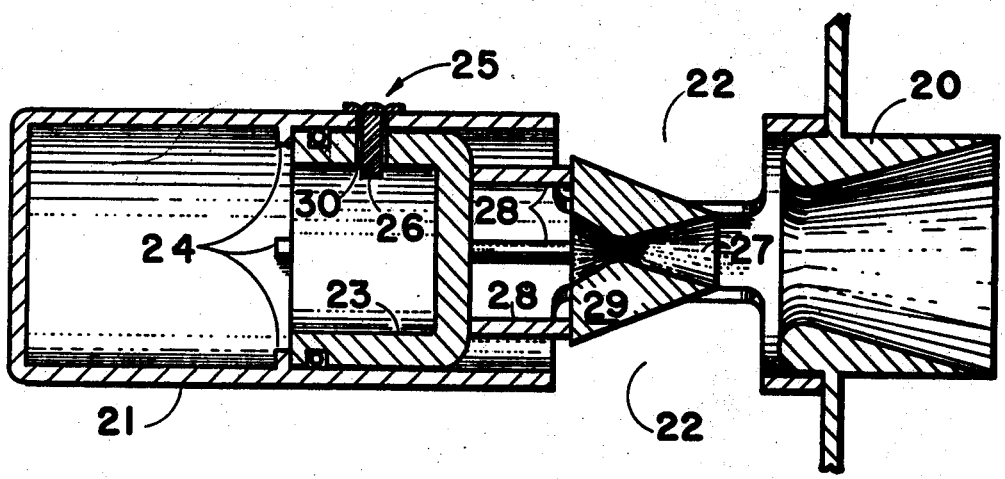

These and other objects of the invention will be readily apparent from the following description of the invention with reference to the accompanying drawing wherein:

FIGURE 1 is a side elevation partly in section of an embodiment of this invention, and FIGURE 2 is a side elevation partly in section of a portion of another embodiment of this invention.

Referring now to FIGURE 1, a dual thrust rocket motor 1 is shown. A solid propellant rocket motor is illustrated herein, however, it is readily apparent that this invention is applicable to other forms of dual thrust reaction motors such as, for example, hybrid propellant and fluid propellant rocket motors.

Motor 1 comirpses a casing 2 provided at its aft end with a large boost nozzle 3 oriented about the longitudinal axis of motor 1 and a plurality of smaller sustain nozzles 4 annularly disposed and equally spaced about boost nozzle 3. The embodiment of FIGURE 1 employs four such nozzles (only two of which appear in the figure), but two, three or more of such nozzles can be employed if desired. The expansion ratios of nozzles 3 and 4 are preferably the same. Means are provided for generating working fluid at first and second mass flow rates, the first rate being higher than the second rate; and in this embodiment, a propellant grain 5 is employed having portion 6, which produces gases at high rate, supperposed upon portion 7, which produces gases at a low rate as is known to the art.

Self-actuating means 8 are provided for varying the total area of the nozzle means and comprise a cylinder 9 supported in alignment with boost nozzle 3 and a piston 10 slidably received in cylinder 9, the aft face of piston 10 being adapted to plug and seal off nozzle 3 when moved into contact therewith as hereinafter described and may carry an elastomeric seal 15 to improve the seal if desired. A plurality of ports 11 are provided in cylinder 9 to provide fluid communication between the interior of rocket motor 1 and nozzle 3. Bleed means 12 are also provided for introducing combustion gases into the volume forward of piston 10 at a rate such that the pressure within this volume is increased to the chamber pressure prior to the burn out of grain portion 6 and the termination of boost phase and is adapted to prevent rapid depressurization of the volume forward of piston 10 upon termination of the boost phase. If desired, means 12 could be fitted with a check valve to prevent any outward flow of gases upon termination of the boost phase. Self-actuated releasable fastening means are employed to maintain piston 10 in a position where it does not obstruct nozzle 3 prior to firing and may comprise shear pin 13 extending through the wall of cylinder 9 into a recess in piston 10. Means are provided to prevent piston 10 from moving to the forward end of cylinder 9 thereby maintaining a sufficient reservoir of gas to prevent any unnecessarily large pressure drop in cylinder 9 when piston 10 moves to the obstructing position. Such means may take the form of shoulder 14 or other protuberances on the inside of cylinder 9.

In operation, grain 5 would be ignited by any of the conventional means known to the art. Upon ignition, a rapid pressure increase is experienced within rocket motor 1, however, bleed means 12 prevents the pressure within cylinder 9 from increasing at the same rate. This pressure differential causes piston 10 to move forward into abutting relationship with means 14 shearing shear pin 13 in the process. During the boost phase gases are vented through nozzles 3 and 4. Bleed means 12 allows the pressure within cylinder 9 to increase to the chamber pressure prior to termination of the burning of the high burning rate portion 6 of propellant grain 5. When portion 6 is consumed and only the slower burning portion 7 is generating gases, a drop in chamber pressure will occur at which time the pressure within cylinder 9 is greater than the chamber pressure. Rapid decay of this pressure is prevented by means 12, which may also incorporate a check valve, and this pressure differential drives piston 10 against nozzle 3 thereby plugging the nozzle. The total port area of nozzles 4 and the burning rate of portion 7 are selected such that steady state conditions of the sustain phase occur at the same chamber pressure as the boost phase. After plugging nozzle 3, the chamber pressure will increase and the sustain phase will operate only with nozzles 4. In this embodiment, the nozzle plugging is accomplished by means which are completely self-actuating and dependent only upon conditions within the combustion chamber. The nozzles for both boost and sustain phases can be also designed for optimum performance in both phases. Under these operating conditions the thrust in the boost and sustain phases will vary with the total throat area functioning in the respective phases. Thus, the larger the throat area of nozzle 3 is with respect to the area of nozzles 4, the greater will be the differential between the boost and sustain thrusts. Extremely wide thrust changes can be obtained by making the area of nozzle 3 substantially greater than that of the combined area of nozzles 4.

In some applications, configuration requirements may prevent the use of multiple nozzles as in FIGURE 1, however, the self-actuating means of this invention can still be employed.

In FIGURE 2, a portion of the aft end of a dual thrust rocket motor employing only one nozzle is shown. In this embodiment the aft end of the rocket motor would be provided with a thrust producing nozzle 20 having cylinder 21 supported in alignment therewith which cylinder is provided with means such as ports 22 for permitting gases to flow through nozzle 20.

Piston 23 is slidably mounted within cylinder 21 and is maintained against protuberances 24 by self-actuated releasing means 25. As an alternative to the shear pin of FIGURE 1, a member 26 having a frangible head is affixed on cylinder 21 with the body portion extending through aligned ports 30 in the piston 23 and cylinder 21. These ports also act as the bleed means and are sized to permit the pressure within the cylinder to gradually increase to chamber pressure as described above. Plug means 29, having an exterior surface contoured to be received in sealing relationship with the inlet and throat of nozzle 20 and having a passage 27 contoured to form a nozzle extending therethrough is mounted on piston 23 by support means 28. This device operates in a manner similar to that of the embodiment of FIGURE 1. Upon ignition the action of the chamber pressure breaks the frangible head of member 26 causing member 26 to be forced out of ports 30 which then act as bleed means to gradually increase the pressure within cylinder 21. Upon termination of the booster phase, the momentary chamber pressure drop allows piston 23 to move aft thereby obstructing nozzle 20 with plug means 29 causing gas to escape through nozzle 27. The burning rate of the sustain phase and the area of the throat of nozzle 27 can be selected to produce any desired chamber pressure although it is preferable from the point of view of optimization of nozzle design to operate at the same or higher pressure than the boost phase. Rather than using a plug provided with a nozzle such as member 29, it is also possible to use a pintle type solid plug in which the plug is smaller than the throat of nozzle 20 and a reduced port area is formed between the exterior of the plug and the interior of nozzle 20.

I claim:

1. In a dual thrust reaction motor comprising a pressure vessel, means for generating a gaseous working fluid in said pressure vessel at first and second sequential rates, said first rate being higher than said second rate, thrust producing nozzle means at one end of said vessel for exhausting said working fluid, and means for obstructing a portion of the area of said nozzle means, the improvement wherein said means for obstructing a portion of the area of said nozzle means comprises:

(a) cylinder means mounted within said vessel, said cylinder means having a distal end away from said nozzle means and an open proximal end toward said nozzle means, said distal end terminating in a wall, (b) piston means slidably received in said cylinder means, said piston means having a first face exposed to the pressure within said cylinder and a second opposite face exposed to the pressure within said vessel, said piston being slidable within said cylinder from a first position wherein said piston does not cause obstruction of said nozzle means to a second position wherein said piston causes obstruction of said nozzle means, and (c) bleed means providing fluid communication between the interior of said vessel and the volume defined within said cylinder, said bleed means permitting the pressure within said volume to increase to the pressure within said vessel prior to the termination of the generation of working fluid at said first rate whereby operation of said rocket motor at said first rate maintains said piston in said first position and said piston moves to said second position upon operation of said rocket motor at said second rate.

2. The dual thrust reaction motor of claim 1 wherein said thrust producing nozzle means comprises:

(a) a first nozzle means disposed about the longitudinal axis of said reaction motor and positioned to be completely obstructed when said piston is in said second position, and (b) a plurality of second nozzle means annularly disposed and equally spaced about said first nozzle means, the expansion ratio of said first and second nozzle means being equal.

3. The dual thrust reaction motor of claim 1 further comprising releasable means for maintaining said piston in a position wherein it does not obstruct said nozzle means, said releasable means being responsive to pressurization of said rocket motor to free said piston.

4. The dual thrust reaction motor of claim 3 wherein said releasable means comprises a shear pin extending through a passage in said cylinder and into aligned recess in said piston, and said piston is maintained by said releasable means in a position intermediate said first position and said second position whereby ignition of said motor causes said piston to move to said first position, thereby shearing said shear pin.

5. A dual thrust reaction motor comprising:

(a) a combustion chamber,
   (b) means for generating combustion gases in said combustion chamber at first and second rates, said first rate being greater than said second rate,
   (c) a first thrust producing nozzle disposed about the longitudinal axis of said reaction,
   (d) a plurality of second thrust producing nozzles annularly disposed and equally spaced about said first thrust producing nozzle, the expansion ratio of said first and second nozzles being equal, and
   (e) plug means responsive to the termination of the generation of combustion gases at said first rate for completely obstructing said first thrust producing nozzle means.

6. The reaction motor of claim 5 wherein the throat area of said first nozzle is substantially larger than the throat area of one of said second nozzles.

7. The reaction motor of claim 5 wherein the throat area of said first nozzle is larger than the combined throat area of said second nozzles.

8. In a dual thrust reaction motor comprising a pressure vessel, means for generating a gaseous working fluid in said pressure vessel at first and second sequential rates, said first rate being higher than said second rate, thrust producing nozzle means for exhausting said working fluid from said combustion chamber, and means for obstructing a portion of the area of said nozzle means upon generation of said working fluid at said second rate; the improvement wherein said means for obstructing a portion of the area of said nozzle means comprises:

(a) cylinder means;

(b) piston means having first and second sides, said piston means being slidably received in said cylinder means and movable therein between first and second positions, said cylinder means and said second side of said piston means defining variable volume chamber means therebetween;

(c) nozzle area restricting means movable by said piston means from a position where the nozzle area is not restricted to a position where the nozzle area is restricted;

(d) fluid communicating means exposing said first side of said piston means to said working fluid; and (e) flow restricting means in fluid communicating relationship between the interior of said combustion chamber and said variable volume chamber means, said flow restricting means being adapted to permit gas to flow into said variable volume chamber means while said working fluid is generated at said first rate and to restrict the flow of gas from said variable volume chamber means upon termination of the generation of said working fluid at said first rate in a manner such that the pressure within said variable volume chamber means increases to a level sufficient to cause the force exerted on said second side of said piston means to exceed the force exerted on said first side of said piston means upon termination of the generation of said working fluid at said first rate by an amount sufficient to move said piston means from said first position to said second position; whereby said nozzle area restricting means are moved into area restricting relationship with said thrust producing nozzle means.

9. The dual thrust reaction motor of claim 8 wherein said piston means are maintained in a position intermediate said first and second position by restraining means, said restraining means being releasable upon the application of the force generated on said piston means upon ignition of said rocket motor by the pressure differential between said first and second sides of said piston whereby said piston is freed and moves to said first position.

10. The dual thrust reaction motor of claim 8 wherein said flow restricting means provides fluid communication between said combustion chamber and said variable volume chamber through said piston means.

References Cited

UNITED STATES PATENTS

| | | | |
|---|---|---|---|
| 3,011,309 | 12/1961 | Carter | 60—242 |
| 3,167,912 | 2/1965 | Ledwith | 60—263 |
| 3,182,447 | 5/1965 | Bell | 60—250 |

MARK M. NEWMAN, Primary Examiner

D. HART, Assistant Examiner

U.S. Cl. X.R.

60—242, 245, 263, 271